United States Patent [19]
Rodriguez et al.

[11] Patent Number: 6,123,162
[45] Date of Patent: Sep. 26, 2000

[54] HAND TRUCK WITH DETACHABLE POWER UNIT

[76] Inventors: Otto M. Rodriguez, 3917 Americana Dr., Tampa, Fla. 33634; Juan A. Lopez, 120 King Arthur Ct., Fayetteville, Ga. 30214

[21] Appl. No.: 09/240,980

[22] Filed: Jan. 29, 1999

[51] Int. Cl.[7] .................................................. B62D 51/06
[52] U.S. Cl. .......................... 180/8.3; 180/8.1; 180/8.2; 280/47.131; 280/47.27
[58] Field of Search ............................ 180/8.1–8.3, 9.22, 180/9.32, 19.1; 280/47.27, 47.131

[56] References Cited

U.S. PATENT DOCUMENTS

| | | |
|---|---|---|
| 2,740,484 | 4/1956 | Montana . |
| 2,856,015 | 10/1958 | Stefan . |
| 2,996,133 | 8/1961 | La Warre et al. . |
| 3,092,200 | 6/1963 | Chambers . |
| 3,330,370 | 7/1967 | Morton . |
| 3,362,496 | 1/1968 | Landry . |
| 3,550,709 | 12/1970 | Hottel ........................................ 180/8.3 |
| 3,554,309 | 1/1971 | Abercrombie ............................ 180/8.3 |
| 3,713,501 | 1/1973 | Hurt . |
| 3,724,864 | 4/1973 | Balsbaugh .......................... 280/47.131 |
| 3,760,897 | 9/1973 | Reynolds et al. ......................... 180/8.3 |
| 3,788,413 | 1/1974 | Miller ....................................... 180/8.3 |
| 3,876,022 | 4/1975 | Ikarimoto . |
| 3,907,138 | 9/1975 | Rhodes ..................................... 180/8.3 |
| 4,062,418 | 12/1977 | Misawa . |
| 4,109,740 | 8/1978 | Andruchiw ............................... 180/8.3 |
| 4,570,953 | 2/1986 | McPeak et al. ...................... 280/47.131 |
| 4,627,508 | 12/1986 | Auer ........................................ 180/9.22 |
| 5,195,762 | 3/1993 | Pressly ................................ 280/47.131 |

OTHER PUBLICATIONS

Wesco Mfg. Co., Lansdale, PA; catalog pp 46 & 47, downloaded on Jan. 27, 1999 from http://www.wescomfg.com/Catalog_Download.html.

*Primary Examiner*—Eric Culbreth
*Assistant Examiner*—L. Lum
*Attorney, Agent, or Firm*—David Kiewit

[57] ABSTRACT

A hand truck has a movable load platform that can be driven upwards and downwards by driving means associated with a readily detachable power unit. This allows an operator to place the hand truck on the ground adjacent a delivery truck, to raise the movable load platform so that it is level with the load bed of the delivery truck, to transfer a heavy package from the delivery truck to the hand truck, and then to lower the elevatable platform so that the loaded hand truck can be pushed across the ground. In addition, the detachable power unit provides a continuous track for urging the hand truck up or down stairs. The track preferably includes a plurality of step engaging members that are sized to firmly engage each tread of a set of stairs so the device is sure-footed.

5 Claims, 3 Drawing Sheets

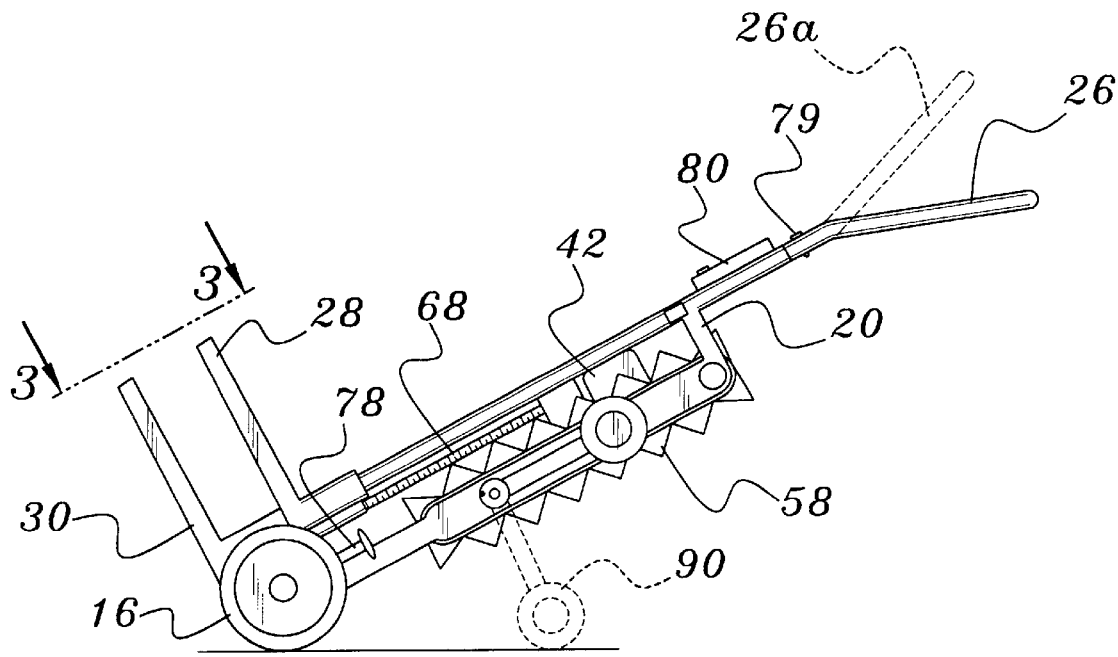
FIG. 2
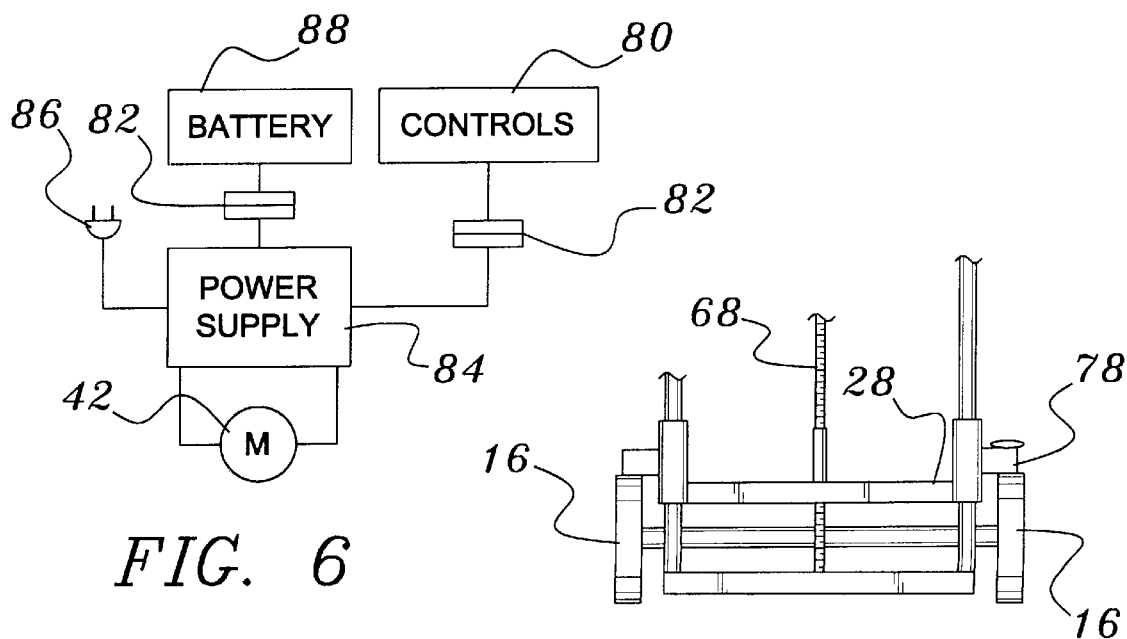
FIG. 6
FIG. 3

HAND TRUCK WITH DETACHABLE POWER UNIT

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to hand trucks and the like, and is more particularly concerned with a hand truck having a powered stair-climbing track, and a powered lift apparatus.

2. Background Information

Hand trucks are very well known in the art, and are frequently used as portable means for carrying cargo or freight of almost any type, as long as the item carried is not so large as to overburden the hand truck. The conventional hand truck is of course very effective when carrying objects along generally flat terrain; but, when heavy material must be carried up or down steps, the hand truck offers little assistance.

In package delivery businesses, for example, it is common to provide a hand truck on a delivery van or light truck. Packages that are somewhat too large or heavy to be conveniently carried from the vehicle to the point of delivery can then be manually unloaded from the delivery vehicle and carried to the point of delivery on the hand truck. Many deliverable items are too large and heavy to be manually unloaded by a single operator, but are nonetheless too small to require the use of heavy duty delivery equipment such as a forklift truck. These items are often handled by sending an assistant along with the driver/delivery operator so that the two workers can jointly lift the burden and carry it to the point of delivery with a manual hand truck. Thus, it is common for package delivery businesses impose two weight limits on packages accepted for delivery. If a package weighs less than a first weight limit (commonly fifty to seventy pounds), it is delivered by a single operator. If the package weighs more than the first weight limit but less than the second (which may be set at one and one half to two times the first weight limit), it is delivered by an operator and an assistant. If the package exceeds the second weight limit, it is deemed to be too large to handle by conventional package delivery means and must be handled by other means, such as delivering it on a medium or heavy duty truck to a loading dock.

Even though package delivery business set weight limits on packages handled, on-the-job lifting injuries are unpleasantly common. Many of these injuries, as well as the operating expense of sending an assistant along whenever a single somewhat heavy package needed to be delivered, could be avoided by providing a hand truck that was light enough to be conveniently used with relatively small packages, but that provided a power assist to allow a single operator to handle somewhat heavy articles. Clearly, neither the hand truck, nor the power assist unit, nor any other separately handled portion of the hand trucking apparatus should exceed the weight limit for single operator handling.

There are several prior art hand trucks that include power means, primarily for urging the hand truck up stairs or the like. Such hand trucks most often take one of two forms: 1) a hand truck having a track that may be relatively wide so as to extend across much of the width of a stair tread and that may include a plurality of cleats thereon, the cleats engaging the edges of steps to move the hand truck up or down the steps (such as that shown in U.S. Pat. No. 3,092,200); and, 2) a hand truck having a continuous belt including at least one relatively narrow protruding member for engaging steps (such as that shown in U.S. Pat. No. 3,330,370), where the protruding member is long enough to extend well past the lip of a stair tread. It is noted that the prior art does not depict powered means adapted to engage a large percentage of a stair tread by extending relatively far across both the width and the depth of a stair tread.

The prior art powered hand trucks are usually very heavy, complex and unwieldy to use. Additionally, one of the difficulties in handling freight is in moving the freight from a truck to the ground, and the prior art hand trucks have no provisions for assisting such motion. The conventional equipment for unloading a truck is a fork lift, but this is a very heavy and expensive piece of industrial equipment that is not economical for use in consumer oriented freight.

Thus, the prior art has not provided a convenient piece of equipment for handling freight and the like for moving the freight from a truck to a consumer.

BRIEF SUMMARY OF THE INVENTION

One of the features of the invention is the provision of relatively light-weight and readily detachable power unit adapted to be used with a relatively light-duty manual hand truck. The power unit, in addition to comprising driving means, may also comprise stair climbing means.

In one embodiment, the invention comprises a hand truck having an movable load platform that can be driven upwards and downwards by driving means associated with a readily detachable power unit. This embodiment provides an advantage in allowing an operator to place the hand truck on the ground adjacent a delivery truck, to raise the movable load platform so that it is level with the load bed of the delivery truck, to transfer a heavy package from the delivery truck to the hand truck, and then to lower the elevatable platform so that the loaded hand truck can be pushed across the ground. Furthermore, this version of the hand truck of the present invention preferably has brakes for the primary wheels, and eyelets for securing the hand truck to a truck or the like for loading the hand truck.

In some embodiments, when a detachable power unit is attached to a hand truck, the present invention provides a hand truck including a continuous track for urging the hand truck up or down stairs. The track preferably includes a plurality of step engaging members sized to firmly engage each tread of a set of stairs so the device is sure-footed. In these embodiments it is preferred for the hand truck of the present invention to include a second pair of wheels for holding the hand truck at an angle for convenience in rolling the truck towards steps.

Although it is believed that the foregoing recital of features and advantages may be of use to one who is skilled in the art and who wishes to learn how to practice the invention, it will be recognized that the foregoing recital is not intended to list all of the features and advantages, Moreover, it may be noted that different embodiments of the invention may provide various combinations of the hereinbefore recited features and advantages of the invention, and that less than all of the recited features and advantages may be provided by some embodiments.

BRIEF DESCRIPTION OF THE SEVERAL VIEWS OF THE DRAWING

These and other features and advantages of the present invention will become apparent from consideration of the following specification when taken in conjunction with the accompanying drawings in which:

FIG. 2 is a side elevational view a second embodiment of the invention.

FIG. 3 is a partial front elevational view of the hand truck of FIG. 2, the view indicated by the line 3—3 in FIG. 2.

FIG. 6 is a schematic block diagram of a control system for the detachable power unit.

DETAILED DESCRIPTION OF THE INVENTION

Figure 1:
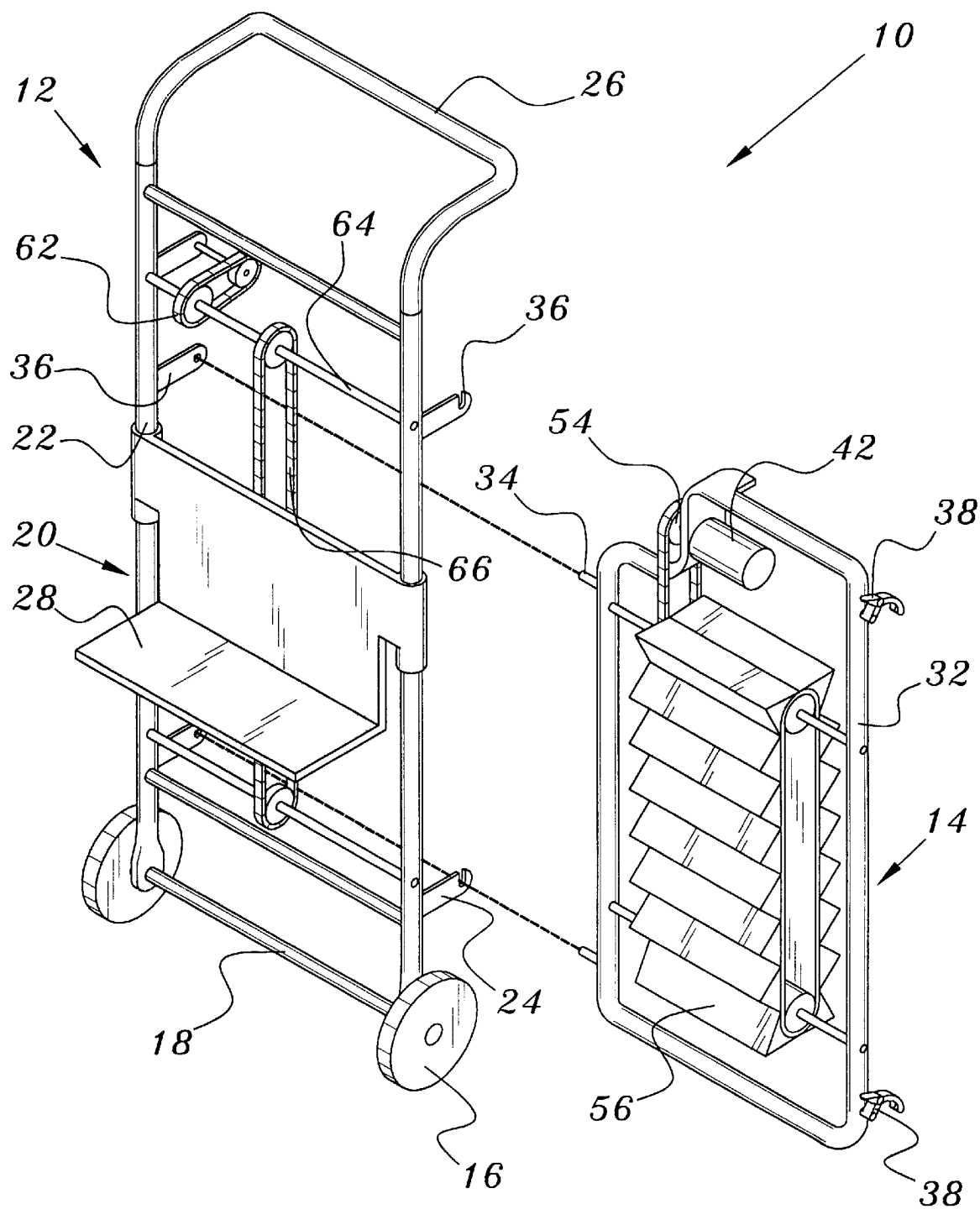
FIG. 1 is an exploded view of a hand truck of the invention showing a manual hand truck comprising an movable load platform and a readily detachable power unit comprising stair climbing means.

A preferred selectively powered hand truck 10 of the invention comprises a manual hand truck 12 and a detachable power unit 14. The manual hand truck 12 comprises several conventional and well known features, such as a pair of main wheels 16 connected by an axle 18, a ladder-type frame 20 comprising side members 22 and one or more cross-tie supports 24, and a handle portion 26, which is preferably reversible or adjustable (as indicated at 26a in FIG. 2) so as to provide an operator (not shown) with a convenient and effective handle for the truck 12. In some embodiments the manual hand truck 12 also comprises a controllably movable load platform 28 adapted to be moved along the axis of the hand truck's frame 20 between a lowered position, in which the platform 28 is adjacent the wheels 16, and a raised position, in which the platform 28 is distal therefrom. In these embodiments, the platform 28 is moved by an associated detachable power unit 14, as will be disclosed in greater detail hereinafter. In some embodiments a fixed load platform 30 may be provided in additional to the movable load platform 28. Moreover, although the preferred movable load platform 28 is attached to the hand truck frame 20, one could also configure apparatus having the movable load platform 28 as a component of the detachable power unit 14.

The detachable power unit 14 preferably comprises a power unit frame 32 adapted to be quickly attached to and detached from the frame 20 of the hand truck 12, preferably without requiring the use of tools. As depicted in FIG. 1, this feature may be provided on one side of the powered hand truck 10 by the combination of mounting pins 34 protruding outward from the power unit frame 32 adapted to be received by cooperating lugs 36 on the side rails 22. On the other side, over-center camming locks 38 disposed on the power unit frame 32 may engage other lugs on the side rails 22. It will be understood by those skilled in the art that many alternative mechanical fastening arrangements, such as threaded studs on one of the two frames 20, 32 cooperating with mounting holes in the other 32, 20, may be employed to attach the power unit 14 to the hand truck 12 as well as to rapidly detach it therefrom.

Figure 4:
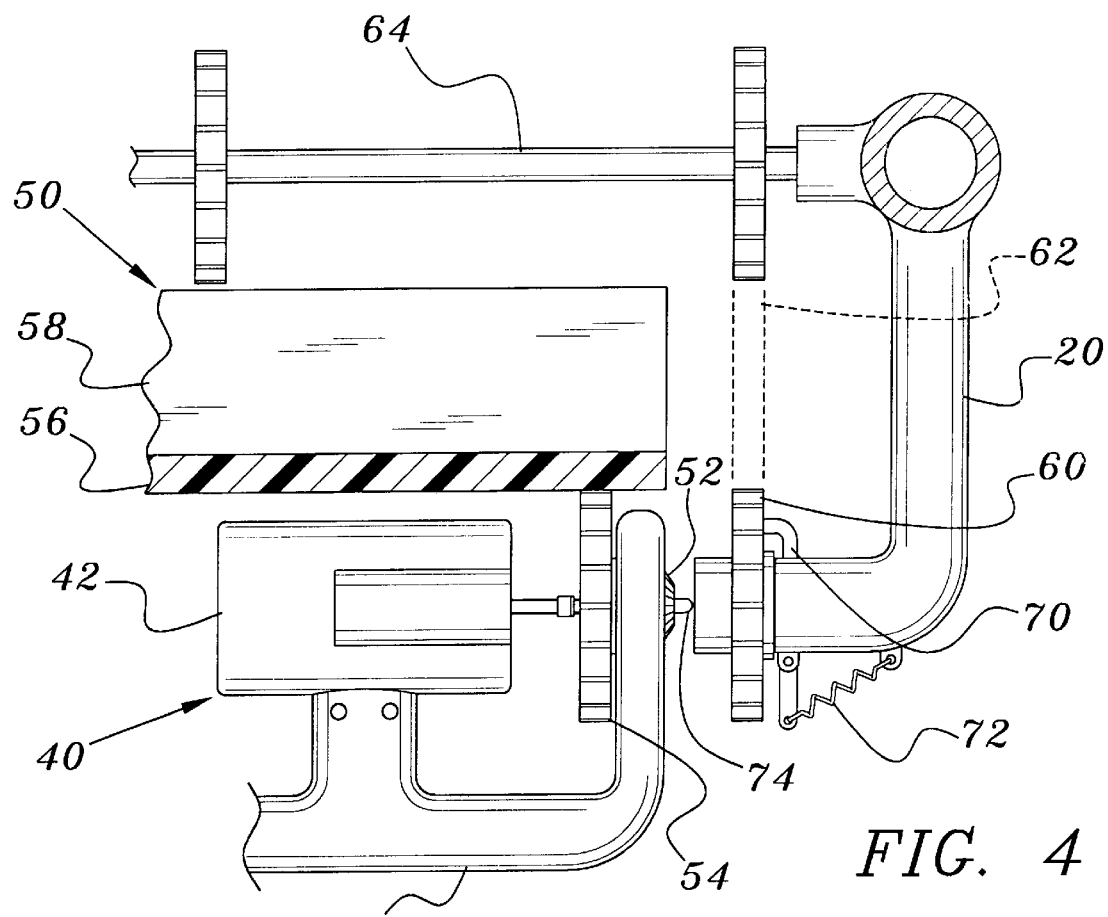
FIG. 4 is a partial and sectioned plan view, generally indicated with the line 4—4 in FIG. 1, the view depicting a preferred drive arrangement in which the drive train is in a first position in which it drives a cleated stair-climbing belt.
Figure 5:
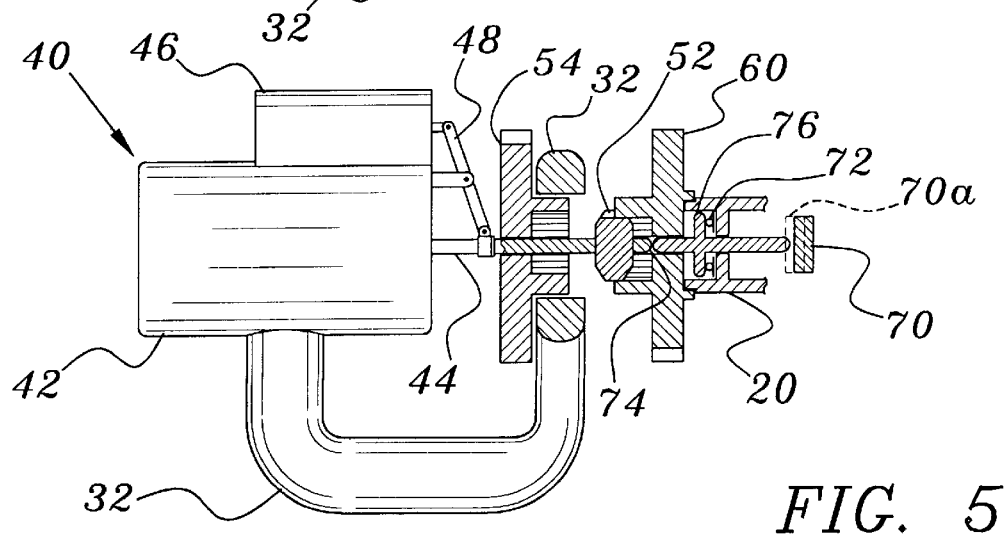
FIG. 5 is a partially cross-sectioned detail view showing a preferred drive arrangement in which the drive train is in a second position in which it drives the movable load platform.

An electric motive power source 40 is preferably attached to and supported by the frame of the power unit 14. In a preferred embodiment the this motive power source 40 is closely similar to the arrangement used for as a starter on an internal combustion engine and may comprise an electric motor 42 (which may be housed with suitable speed reduction gearing (not shown) driving a translatable shaft 44 that can be moved from a retracted position (e.g., as depicted in FIG. 4) to an extended position. As depicted in FIG. 5, this may be done by means of a solenoid 46 and solenoid fork 48 acting against a bias spring (not shown) biasing the shaft 44 into the retracted position. As is well known in the vehicular arts, when a starter motor is turned on, it extends its translatable shaft and rotates a beveled gear at the distal end thereof. When the starter motor is turned off, the translatable shaft retracts. In one embodiment of the present invention, the motive power source 40 is configured to drive only one of the movable load platform 28 and stair climbing means 50 when the translatable shaft 44 is retracted and to drive only the other when the translatable shaft 44 is extended. The preferred motive power source 40 is additionally distinguished from an internal combustion engine starter in that it is capable of rotating the translatable shaft 44 in either of the two possible rotational directions so that the movable load platform 28 can be driven in either of two directions, depending on whether a load is to be raised or lowered, and so that the stair climbing means 50 can aid in moving an object either up or down a set of stairs.

One arrangement for selectively driving apparatus of the invention is generally depicted in FIGS. 4 and 5. When the translatable shaft 44 is retracted (e.g., as depicted in FIG. 4) a doubly-beveled gear 52 engages a stair-climbing drive sprocket 54 that is journaled for rotation within the frame 32 of the power unit 14. A cleated belt 56 is in turned engaged and driven by the sprocket 54. Conversely, when the translatable shaft 44 is extended (e.g., FIG. 5) the doubly-beveled gear 52 engages and drives a platform drive sprocket 60 that is journaled for rotation with respect to the frame 20 of the hand truck 12. A transversely ribbed timing belt 62, bicycle chain, gear train, or other suitable linkage means may be employed to link the platform drive sprocket 60 to a drive shaft 64 to which the movable load platform 28 may be linked by a second timing belt 66 or other suitable means. It will be realized by those skilled in the arts that other arrangements for driving the stair climbing means 50 or the movable platform (e.g., the lead screw 68 depicted in FIGS. 2 & 3) may also be used.

Another useful feature is that of a safety interlock for the movable platform 28 in order to keep a loaded platform from falling freely to the ground if the driving mechanism is suddenly disconnected (e.g., as might happen if the solenoid 46 burned out while a load was being lifted and the translatable shaft retracted). One approach to providing this interlock feature is depicted in FIGS. 4 and 5 where a braking finger 70 pivotally attached to the hand truck frame 20 is urged by a brake bias spring 72 into an interfering contact (e.g., inserted into a hole in the sprocket) with the platform drive sprocket 60 when the translatable shaft 44 is retracted. When the translatable shaft 44 is extended so that the gear 52 adjacent the end of the shaft 44 distal from the motor 42 drivingly engages the platform sprocket 60, the distal end 74 of the shaft 44 bears on a springloaded brake release member 76 journaled for rotation with respect to the hand truck frame 20. The brake release member 76 is thereby translated outwardly of the frame 20 so that it pushes the braking finger 70 from its braking position 70a to a disengaged position which permits rotation of the platform drive sprocket 60.

Also, as noted hereinbefore, it is expected that some embodiments of the apparatus of the invention 10 will comprise components useful in holding a hand truck in a stable position adjacent a motor vehicle so that a movable load platform 28 can be safely raised, loaded, and lowered. These components may comprise some combination of wheel brakes 78 and tethering means 79 (such as eyelets disposed on the frame 20 of the hand truck).

User controls 80 for the detachable power unit may be disposed on the hand truck 12 or on a readily accessible portion of the detachable power unit 14. If the former choice is made, the designer will, of course, provide a connector 82 for disconnecting the user controls 80 when the power unit 14 is detached. A preferred power unit comprises a power supply 84 powered either by an extension cord 86 connected to AC mains power, or by a battery 88. Because of the weight limits discussed supra, and because batteries are heavy items, it is expected that a battery 88 used to power the apparatus 10 may carried in a delivery truck separately from the manual hand truck 12 and power unit 14 and may be connected to the power unit 14 only after the power unit and manual hand truck 12 have been interconnected.

As noted supra, prior art hand trucks comprising powered stair climbing means do not provide cleats or other stair-tread engaging means that extend relatively far across the width of the stair tread and relatively deeply into the depth of a stair tread. Preferred embodiments of the invention comprise one or more cleated endless traction belts 56 comprising large cleats 58 movably attached to the power unit frame 32 and adapted to be driven by the electric motive power means 40, as discussed supra. If a single traction belt 56 is employed (e.g., the depiction of FIG. 1), it is chosen to extend laterally across much of the width of the hand truck 10 so that the large cleats 58 can engage as much of the width of a stair tread as is practical. As is known in the art, one can also use an arrangement having two narrower traction belts. Also, as is known in the art, the drive unit 40 may be disposed inside a single belt, between a pair of belts, or (as depicted in FIG. 1) elsewhere disposed. Moreover, in some embodiments of the invention auxiliary wheels 90 are attached to the powered hand truck 10 so that unit can be tilted into a stair-climbing attitude before engaging the stairs.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. Apparatus comprising a combination of a manual hand truck and a detachable power unit wherein:

the hand truck comprises a hand truck frame, a pair of main wheels, and a movable load platform movable between a lowered position adjacent the wheels and a raised position distal from the wheels; and the detachable power unit comprises a power unit frame comprising attachment means adapted to attach the power unit frame to the hand truck frame; and an electric motive power source attached to the power unit frame; and wherein the motive power source is adapted to selectively drive, when the power unit frame is attached to the hand truck frame, either a stair climbing means comprising a cleated belt, the stair climbing means attached to the power unit frame; or the movable load platform.

2. The apparatus of claim 1 wherein the hand truck further comprises locking means adapted to prohibit the movable platform from moving when the power unit is detached from the hand truck.

3. The apparatus of claim 1 wherein the motive power source comprises an electric motor adapted to rotate a translatable shaft movable between an extended and a retracted position, the translatable shaft engaging only one of the stair climbing means and the movable load platform when in the extended position, the translatable shaft engaging only the other of the stair climbing means and the movable load platform when in the retracted position.

4. A powered hand truck comprising a power unit, a stair climbing means comprising a cleated belt, and a movable load platform, the power unit comprising an electric motor adapted to rotate a shaft translatable between a retracted and an extended position; the shaft, when in the retracted position, engaging a first drive means adapted to drive only one of the stair climbing means and the movable load platform; the shaft, when in the extended position engaging a second drive means adapted to drive only the other one of the stair climbing means and the movable load platform.

5. The powered hand truck of claim 4 wherein the stair climbing means is attached to the power unit and wherein the power unit is attached to a frame of the hand truck by attachment means permitting detachment of the power unit from the frame of the hand truck by an operation not requiring the use of tools.

\* \* \* \* \*